United States Patent [19]

Henry

[11] 4,325,432
[45] Apr. 20, 1982

[54] METHOD OF OIL RECOVERY

[76] Inventor: John T. Henry, 611 E. Market St., Farmer City, Ill. 61842

[21] Appl. No.: 138,098

[22] Filed: Apr. 7, 1980

[51] Int. Cl.$^3$ .................... E21B 43/24; B01D 53/00
[52] U.S. Cl. .................................. 166/245; 166/271; 166/272; 423/239
[58] Field of Search ............... 166/245, 271, 272, 303, 166/57; 423/210, 239, 247

[56] References Cited

U.S. PATENT DOCUMENTS

| | | | |
|---|---|---|---|
| 956,058 | 4/1910 | Elten | 166/303 |
| 2,421,528 | 6/1947 | Steffen | 166/303 X |
| 2,734,578 | 2/1956 | Walter | 166/272 |
| 3,232,885 | 2/1966 | Henke | 60/297 X |
| 3,241,611 | 3/1966 | Dougan | 166/272 X |
| 3,342,259 | 9/1967 | Powell | 166/272 |
| 3,344,856 | 10/1967 | Lange | 166/245 |
| 3,351,132 | 11/1967 | Dougan et al. | 166/272 X |
| 3,360,044 | 12/1967 | Lange | 166/272 |
| 3,429,656 | 2/1969 | Taylor et al. | 423/239 X |
| 3,516,495 | 6/1970 | Patton | 166/272 |
| 3,517,744 | 6/1970 | Horton | 166/245 |
| 3,605,885 | 9/1971 | Leeper | 166/57 |
| 3,682,585 | 8/1972 | Frevel et al. | 423/239 X |
| 3,700,035 | 10/1972 | Lange | 166/57 X |
| 3,833,059 | 9/1974 | Sisson | 166/303 X |
| 3,880,982 | 4/1975 | Stenzel | 423/239 X |
| 4,014,575 | 3/1977 | French et al. | 299/2 |
| 4,119,566 | 10/1978 | Crouch et al. | 166/303 |
| 4,207,291 | 6/1980 | Byrd et al. | 423/210 X |

OTHER PUBLICATIONS

McWilliams, L. L., "Source and Purification of Gas Supply", *Secondary Recovery of Oil in the United States*, API 1950, pp. 383-389.
Knight, W. N. N. et al., "Cracking and Reforming", *Modern Petroleum Technology*, Applied Science Publishers LTD, 1973, pp. 322-325.

*Primary Examiner*—James A. Leppink
*Assistant Examiner*—George A. Suchfield
*Attorney, Agent, or Firm*—Allegretti, Newitt, Witcoff & McAndrews

[57] ABSTRACT

This invention relates to a method of recovering petroleum from a subterranean petroleum-containing formation comprising the steps of providing an injection well containing a flow path in fluid communication with at least a portion of the petroleum-containing formation, providing at least one production well in fluid communication with at least a portion of the petroleum-containing formation, providing heated and pressurized combustion byproducts, rendering the combustion byproducts relatively inert by contacting same with manganese and/or manganese dioxide, heating the combustion byproducts to a predetermined temperature, and injecting the heated combustion byproducts into the injection well for heating the petroleum in the petroleum-containing formation to render it less viscous and for pressurizing the petroleum to help force it to the production well for receiving it from the petroleum-containing formation.

9 Claims, 3 Drawing Figures

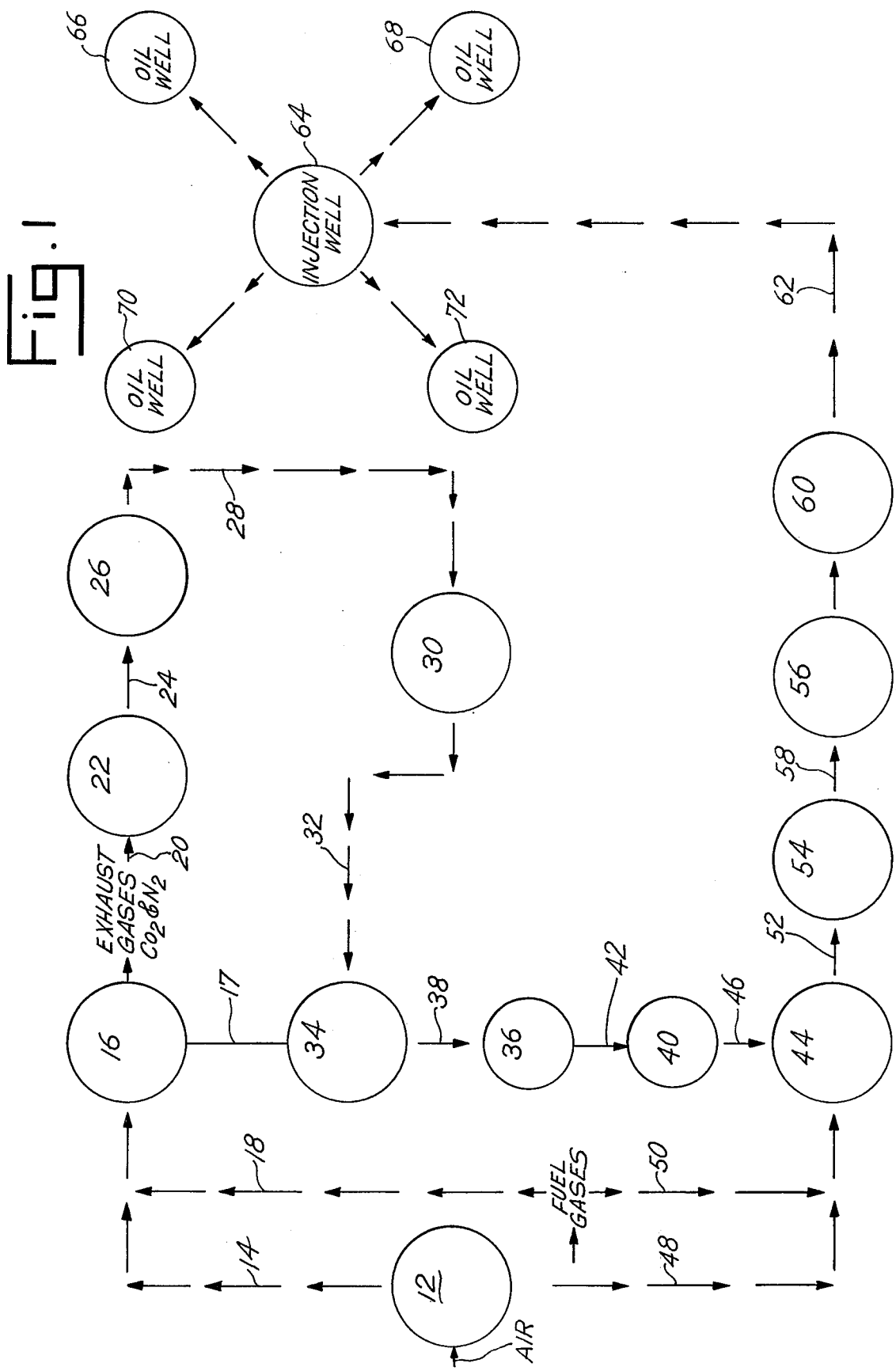

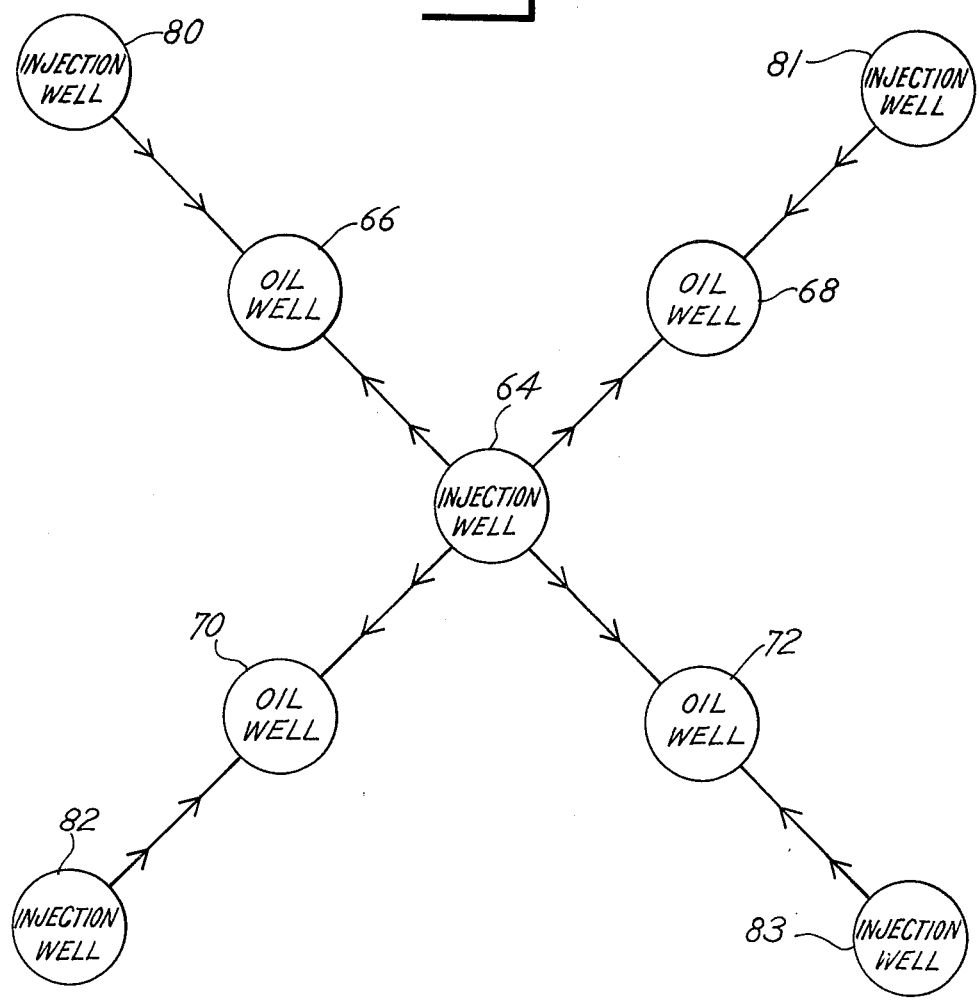

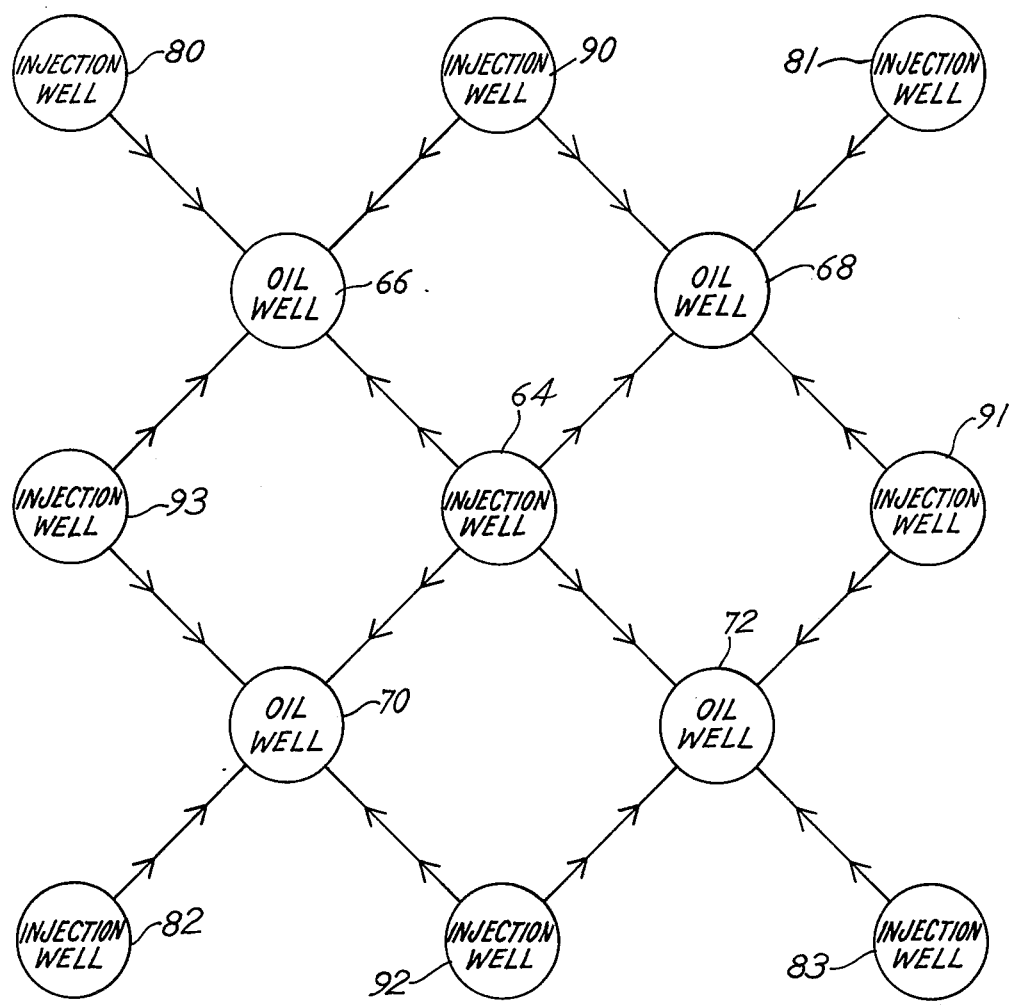

METHOD OF OIL RECOVERY

An aspect of this invention is the spacing of production wells about a centrally disposed injection well to help increase the production for the subterranean petroleum-containing formation.

BACKGROUND OF THE INVENTION

This invention pertains to an improved method for recovering subterranean petroleum in situ from a petroleum-containing formation.

Many petroleum-containing formations have considerably more petroleum than can be recovered by primary production. In some petroleum-containing formations, the viscosity of the petroleum or oil is so great that little or no primary production is possible.

Various efforts and techniques have been tried to recover oil from oil containing formations where primary production is no longer economically feasible or no longer possible due to relatively high viscosity and/or insufficient pressure to move the oil to the production well for recovery from the oil containing formation or where oil was so viscous that primary production was not feasible in the first instance.

One method to increase production from an oil bearing formation in the ground is steam flooding, which entails injecting steam into an oil well and allowing the steam to remain in the formation for a selected period of time (often referred to as the soak period). The viscosity of the oil is reduced and some gas is generated by the heating of some lighter oil in the formation. The gas provides pressure to force the thinned or less viscous oil to the oil well. Often the pressure is short lived and relatively little additional oil is recovered by this technique.

Another method of enhancing production of oil from an oil bearing production is a steam drive process in which steam is injected into the oil bearing formation in a more or less continuous fashion through an injection well and oil is recovered from the formation from a spaced-apart production well. A disadvantage of this technique is that often steam will channel across the top of the oil bearing formation and in effect impede recovery of oil from the bottom or lowermost portions of the formation.

Water flooding is another technique that has been employed for recovery of oil from partially depleted oil bearing formations after termination of primary production. Water is injected into the oil bearing formation at various locations where the water can displace the oil and force it toward and into production wells. This technique is not too successful in some oil bearing formations, for example, where the oil is too viscous, where the formation is too permeable, and where the formation is relatively deep in the ground.

Leeper U.S. Pat. No. 3,605,885 suggests a technique of enhancing secondary recovery of oil from oil containing formations by injecting heated gas and steam into an injection well for heating the oil in the oil bearing formation to reduce its viscosity.

The present invention comprises an improvement over the subject matter disclosed in the Leeper patent and pertains to an improved method for increasing the production of oil from an oil bearing formation.

An object of this invention is to provide an improved method for secondary recovery of oil from oil bearing formations, including shale formations, wherein the disadvantages and deficiencies of present methods of secondary recovery are overcome.

Another object of the present invention is to provide an improved method for recovering oil from oil containing formations using heated and pressurized combustion byproducts which have been rendered inert by contact with manganese and/or manganese dioxide and which are injected into the oil bearing formation at predetermined pressure and temperature conditions to render the oil in the oil bearing formation less viscous and to force it to the production well for recovering more oil from the oil bearing formation.

Another object of the present invention is to recover oil from shale oil bearing formations by injecting combustion byproducts heated to temperatures within the range of 900°–1200° F. to free oil from the shale oil bearing formation.

Yet another object of this invention is to provide an improved method of oil recovery from an oil bearing formation wherein the production wells and injection wells are arranged to help maximize the oil recovered.

Other objects and advantages of the present invention will be made more apparent hereinafter.

BRIEF DESCRIPTION OF THE DRAWING

There is shown in the attached drawing presently preferred embodiments of the present invention wherein:

FIG. 1 is a schematic diagram of a system operative in accordance with the novel method of this application of recovering petroleum from a subterranean petroleum-containing formation;

FIG. 2 is a schematic diagram of an arrangement of injection wells and production wells for increasing production from a subterranean petroleum-containing formation; and FIG. 3 is a schematic diagram of a modified arrangement of injection wells and production wells for further increasing production from a subterranean petroleum-containing formation.

DETAILED DESCRIPTION OF THE PRESENT INVENTION

There is shown in FIG. 1 a system that is operative in accordance with the novel method of recovering petroleum from a petroleum-containing formation. The petroleum-containing formation may comprise a formation that contains petroleum so viscous that primary production was not feasible or petroleum remaining after primary production was no longer economically feasible or possible due to relatively high viscosity and/or insufficient pressure to move the petroleum (oil) to the production well. Alternately, the petroleum-containing formation may be a shale oil bearing formation.

The system 10 includes an air humidifier and temperature stabilizer 12 for air to be supplied to components of the system 10. The stabilizer 12 will maintain the air at a constant 70° F. and forty (40) percent humidity. The treated air passes from stabilizer 12 via conduit 14 to an internal combustion engine 16. The internal combustion engine 16 is preferably a 400 horsepower Caterpillar Tractor Company engine powered by natural gas. Natural gas is fed to the internal combustion engine from conduit 18 connected to a suitable source. The exhaust gases from the internal combustion engine 16 comprise approximately eleven percent (11%) carbon dioxide and eight-five percent (85%) nitrogen.

These exhaust gases are fed through conduit 20 to a gas cooler and scrubber 22. The gas from the cooler and scrubber 22 is fed through conduit 24 to pressure control and vent 26 for constant pressure and recording. Control and vent 26 preferably comprise a Fisher Controls Company Inc. back pressure valve and vent with an automatic control for constant pressure and a commercially available recording device set to an appropriate pressure for control of the exhaust gases and to prevent back pressure from building up on the internal combustion engine 16.

The gas from control and vent 26 passes through conduit 28 to catalytic converter 30. Preferably, the catalytic converter 30 comprises a cylinder approximately six feet long and twelve inches in diameter. Within the catalytic converter is a bed of manganese and/or manganese dioxide. The gases will pass through the manganese and/or manganese dioxide from an inlet at the top of the converter 30 and an outlet at the bottom to make the $CO_2$ and $N_2$ completely inert. Nitrous oxide is removed from the gas to prevent corrosive damage to other components of the system including the lifting apparatus in the production wells. The solid metal catalyst in converter 30 will last approximately two to three years and can be replaced, as needed.

The inert gas will flow from catalytic converter 30 to the compressor 34 through conduit 32. This gas will have a temperature of about 180° to 200° F. at the inlet to compressor 34. Preferably, compressor 34 is a two-stage Denver-Gardner MC Compressor having 150 psi low side or inlet pressure and 1500 psi high side or outlet pressure. The compressor 34 may be advantageously driven by internal combustion engine 16 via mechanical drive means 17 such as belt and pulley means, a gear train or the like.

Downstream from the compressor 34 are provided two solid bed dehydrators in series to remove moisture from the gases. The system produces about 0.06 gallons of water/MCF and the dehydrators assist in removal of this water from the system. Dehydrator 36 is connected to the dehydrator 36 via conduit 42. Through two dehydrators 36, 40 are shown, a single dehydrator of larger capacity may be used. The dehydrators 36,40 remove moisture that might mix with the gases and become corrosive and damage components of the system 10.

Gases from dehydrator 40 pass to earth formation heating device 44 via conduit 46. The heating device 44 is also supplied with air from conduit 48 that communicates with stabilizer 12 and fuel gas from conduit 50 that communicates with a source of fuel gas. The heating device 44 is generally of the type shown in Leeper U.S. Pat. No. 3,605,885 and reference may be made to said patent for further details of the heating device. The device 44 functions to elevate the temperature of the gases to the desired temperature. Heated and pressurized combustion by-products will be discharged from the device 44. Device 44 is capable of providing gas only to conduit 52 or gas and steam if the petroleum-bearing formation responds to nitric acid and carbonic acid.

A commercially available Murphy or Fisher Controls Company, Inc. monitoring and recording unit 54 is connected to the heating device 44 via conduit 52. Unit 44 will maintain 400° F. for recovery of viscous oil and for secondary recovery and from 900° F. to 1200° F. to decompose the Kerogen in shale to enable recovery of shale oil.

The unit 56 is a Murphy or Fisher Controls Company, Inc. final pressure control and heat control monitoring and recording device that is provided with an adjustable pressure vent to maintain the desired heat for the operating mode with approximately 850 psi pressure at the inlet to the injection well. Unit 56 is connected to unit 54 via conduit 58.

As shown in FIG. 1, a solid bed dehydrator 60 may be positioned between unit 56 and injection well 64 in conduit 62 for removing moisture from gas flowing from the unit 56.

Equidistantly spaced about injection well 64 are a plurality of production wells 66, 68, 70 and 72. The injection well 64 is perforated at the pay zone in the subterranean petroleum-bearing formation.

The apparatus of the present invention is portable and is movable to and set in place at the situs of the oil-bearing formation. The apparatus is essentially selfcontained and only requires connection to a fuel supply and to the injection well or wells. After the oil wells and injection wells are in place, either existing or newly drilled, the oil-bearing formation may be fractured to increase the porosity of the oil-bearing formation and provide better communication between the oil wells and the cooperating injection wells. Fracturing may not be needed for secondary or tertiary recovery in oil fields that were drilled from primary recovery and then abandoned. Fracturing will generally be needed for primary recovery in viscous or heavy oil or shale formations.

Fracturing may be accomplished by conventional means, for example, by introducing MCA (mud cutting acid) or water, or sand, or rock salt, or a combination thereof, under pressure to increase the porosity of the oil-bearing formation and provide better fluid communication between the oil wells and the cooperating injection well to help maximize recovery from the oil-bearing formation.

Heat and pressure from the injection well 64 will drive the oil to the production wells 66, 68, 70 and 72. The production wells 66, 68, 70 and 72 will use Jensen pumps to lift the oil from the pay zone to the surface in a conventional manner.

The size of compressor 34 can be increased and the size of the heating device 44 can be increased in the event higher pressures, higher heat or greater volumes of gas are required.

Often today, internal pressure at the oil-bearing formation or bottom hole pressure is substantially depleted after primary production because of oil well drilling and test bores. The present method uses heat and pressure to pressurize the oil within the oil-bearing formation and reduce its viscosity so as to move all oil to the oil wells for recovery from the oil-bearing formation.

In FIG. 2 there is shown an arrangement of injection wells and production wells for enchancing production of oil from a subterranean oil-bearing formation. Essentially, injection wells 80, 81, 82 and 83 are disposed in line and on opposite sides of wells 66, 68, 70 and 72 from the centrally disposed injection well 64. The production wells are spaced about 660 feet from the injection well. The spacing and orientation help to enhance recovery of oil using the improved method of this case.

In FIG. 3 there is shown a modified arrangement of injection wells and production wells for further increasing production from a subterranean oil-bearing formation. Essentially, four production wells are surrounded by nine injection wells. An injection well is in line with and on opposite sides of each production well. As compared to FIG. 2, the arrangement of FIG. 3 includes the addition of four injection wells 90, 91, 92 and 93. The oil wells 66, 68, 70 and 72 are each equidistantly spaced from the adjacent injection wells. The spacing is on the order of 660 feet for maximum recovery efficiency.

An important advantage of the present invention is that relatively pure and dry $CO_2$ and $N_2$ are injected into the petroleum-bearing formation. For each cubic foot of natural gas burned in the engine 16 under proper conditions, approximately 8.5 cubic feet of $CO_2$ and $N_2$ will be produced. Actual volume will be a bit higher. A 100 HP engine with a specific fuel consumption rate of 10 cubic feet/bhp/hr will produce approximately 240 MCF/day of carbon dioxide $CO_2$ and $N_2$. Should propane be used in place of natural gas in engine 16, each cubic foot burned will produce approximately 22 cubic feet of $CO_2$ and $N_2$ (dry). Actual volume will range from 22 to 25 cubic feet. A 100 HP engine with a fuel consumption of 4.25 cubic feet/bhp/hr will produce approximately 240 MCF/day of $CO_2$ and $N_2$. Both $CO_2$ and $N_2$ are readily soluble in the oil. It has been found that the yield of oil can be significantly enchanced—on the order of twenty percent (20%). For example, ten barrels of heavy oil injected with gases via injection well 64 will produce twelve barrels of oil by volume.

It is clear from the foregoing specification that the present invention can be used to repressure and recover oil from old oil fields. The $CO_2$ and $N_2$ are easy to handle, with little danger. It is possible to raise production from one barrel per day in a stripper well up to one hundred barrels per day in a period of seven days. Most of the oil remains in place in a petroleum-bearing formation after primary recovery because of the loss of pressure, hence the loss of drive to the production well bores. This invention advantageously provides a source of make-up gas to pressurize the oil and enhances secondary or tertiary recovery.

This invention is also helpful to lift viscous oil which cannot now be recovered by primary recovery. The viscous oil is heated, causing it to flow, and pressured to drive it to the production wells.

Also, the $CO_2$ and $N_2$ in the gases are readily soluble in the oil, increasing the volume of the oil and helping to keep it in a less viscous and flowing state. The apparatus to carry out the novel method can be packaged and delivered to the oil field as a unit. Connections need be made only to a source of fuel gas and to the injection well or wells.

There is no need to remove the overburden when using the present invention. Oil is recovered in situ, with a minimum of disruption of the surface environment.

It is estimated that there are over 150 billion barrels of viscous or heavy oil in place in the United States. The lowest gravity of heavy oil in the reservoirs in the United States is 1° API, and the gravity of the oil in half the reservoirs is between 22° and 25° API. The present invention can be used for enhancing recovery of oil from almost all of these reservoirs of heavy oil.

While I have disclosed presently preferred embodiments of the present invention, it will be understood that the invention is limited only within the scope of the attached claims.

I claim:

1. A method of recovering petroleum from a subterranean petroleum-containing formation, comprising: providing an injection well containing a flow path in fluid communication with at least a portion of the petroleum-containing formation, providing combustion byproducts from an internal combustion engine, rendering the combustion byproducts relatively inert by contacting same with manganese and/or manganese dioxide, pressurizing the combustion byproducts to about 1,500 p.s.i., heating the combustion byproducts to a predetermined temperature of at least 400° F., adding fuel gas to the combustion byproducts at the same time that they are heated to a predetermined temperature, and injecting the combined combustion byproducts and fuel gas into the petroleum-containing formation to increase the volume of the petroleum, to heat the petroleum to reduce the viscosity thereof to enhance the flow of the petroleum and to pressurize the petroleum to help force it to the production well so as to increase the recovery of petroleum from the petroleum-containing formation.

2. The method of claim 1 including the step of removing moisture from the combustion byproducts after pressurizing them.

3. The method of claim 2 including the step of maintaining the pressure at the injection well at approximately 850 psi.

4. The method of claim 1 wherein said predetermined temperature is on the order of 900°–1200° F. for recovery of petroleum from a shale petroleum-containing formation.

5. The method of claim 1 including providing at least four production wells equidistantly spaced from the centrally disposed injection well.

6. The method of claim 5 including spacing an additional injection well adjacent each production well and in line with the production well and centrally disposed injection well.

7. The method of claim 1 including spacing the production wells about 660 feet from the centrally disposed injection well.

8. The method of claim 1 wherein said predetermined temperature is on the order of 1,000–1,200 F. for recovery of petroleum from a shale petroleum-containing formation.

9. The method of claim 1 including provided at least four injection wells approximately equidistantly spaced from a centrally disposed production well.

* * * * *